US011279260B2

(12) United States Patent
Kim et al.

(10) Patent No.: US 11,279,260 B2
(45) Date of Patent: Mar. 22, 2022

(54) SEAT CUSHION TILTING APPARATUS OF FOLD-AND-DIVE SEAT

(71) Applicants: Hyundai Motor Company, Seoul (KR); Kia Motors Corporation, Seoul (KR)

(72) Inventors: Mu Young Kim, Hwaseong-Si (KR); Sang Do Park, Suwon-Si (KR); Jun Young Yun, Osan-Si (KR); Chan Ho Jung, Gunpo-Si (KR); Ho Suk Jung, Hwaseong-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/890,306

(22) Filed: Jun. 2, 2020

(65) Prior Publication Data

US 2021/0170918 A1 Jun. 10, 2021

(30) Foreign Application Priority Data

Dec. 10, 2019 (KR) .................. 10-2019-0163257

(51) Int. Cl.
    *B60N 2/14* (2006.01)
    *B60N 2/20* (2006.01)
    *B60N 2/30* (2006.01)
    *B60N 2/36* (2006.01)
    *B60N 2/02* (2006.01)

(52) U.S. Cl.
    CPC ............ *B60N 2/0232* (2013.01); *B60N 2/20* (2013.01); *B60N 2/3011* (2013.01); *B60N 2/3045* (2013.01)

(58) Field of Classification Search
    CPC ...... B60N 2/0232; B60N 2/20; B60N 2/3011; B60N 2/3045
    USPC .................. 297/331, 334, 378.12, 378.14
    See application file for complete search history.

(56) References Cited

U.S. PATENT DOCUMENTS

| | | | | |
|---|---|---|---|---|
| 5,626,391 | A * | 5/1997 | Miller | B60N 2/01583 297/331 |
| 6,135,558 | A * | 10/2000 | Behrens | B60N 2/20 297/378.12 X |
| 6,199,951 | B1 * | 3/2001 | Zeile | B60N 2/3011 297/378.12 X |
| 6,655,738 | B2 * | 12/2003 | Kammerer | B60N 2/0292 296/65.09 |
| 6,857,703 | B2 * | 2/2005 | Bonk | B60N 2/01583 297/378.14 |
| 6,860,562 | B2 * | 3/2005 | Bonk | B60N 2/01583 297/378.12 |

(Continued)

*Primary Examiner* — Rodney B White
(74) *Attorney, Agent, or Firm* — Morgan, Lewis & Bockius LLP (57) ABSTRACT

A seat cushion tilting apparatus may include a fold-and-dive seat for vehicles in which tilting of a seat cushion is independently adjusted regardless of the position of a seat back, and thus, a passenger may realize a desired relaxation posture, where both reclining of the seat back of the fold-and-dive seat and tilting of the seat cushion, in which the front end portion of the seat cushion is raised or lowered regardless of the reclining position of the seat back, are enabled, and thus, body pressure may be easily distributed to the passenger's hips and thighs and fatigue to the passenger's lower body may be reduced.

10 Claims, 11 Drawing Sheets

(56) References Cited

U.S. PATENT DOCUMENTS

| | | | | |
|---|---|---|---|---|
| 6,902,236 | B2* | 6/2005 | Tame | B60N 2/206 |
| | | | | 297/378.12 X |
| 7,040,684 | B2* | 5/2006 | Tame | B60N 2/206 |
| | | | | 297/378.12 X |
| 7,100,984 | B2* | 9/2006 | Epaud | B60N 2/06 |
| | | | | 297/378.12 X |
| 7,121,624 | B2* | 10/2006 | Pejathaya | B60N 2/0232 |
| | | | | 297/378.12 |
| 7,517,022 | B2* | 4/2009 | Habedank | B60N 2/06 |
| | | | | 297/378.12 X |
| 7,651,166 | B2* | 1/2010 | Schwingenschlogel | |
| | | | | B60N 2/12 |
| | | | | 297/378.12 |
| 8,047,610 | B2* | 11/2011 | Yamagishi | B60N 2/36 |
| | | | | 297/334 X |
| 8,474,910 | B2* | 7/2013 | Kammerer | B60N 2/3031 |
| | | | | 297/334 |
| 8,616,642 | B2* | 12/2013 | Sung | B60N 2/3013 |
| | | | | 297/334 X |
| 10,589,642 | B2* | 3/2020 | Handigol | B60N 2/20 |
| 2003/0209932 | A1* | 11/2003 | Brush | B60N 2/305 |
| | | | | 297/378.1 |
| 2004/0113410 | A1* | 6/2004 | Morino | B60N 2/3065 |
| | | | | 297/331 X |
| 2011/0260518 | A1* | 10/2011 | Scheurer, II | B60N 2/3065 |
| | | | | 297/378.12 |
| 2015/0151654 | A1* | 6/2015 | Rothstein | B60N 2/309 |
| | | | | 297/378.14 |
| 2015/0158399 | A1* | 6/2015 | Zeimis, III | B60N 2/3065 |
| | | | | 297/340 |
| 2017/0080831 | A1* | 3/2017 | Kaemmerer | B60N 2/309 |
| 2018/0257516 | A1* | 9/2018 | Becker | B60N 2/3056 |
| 2019/0366886 | A1* | 12/2019 | Sivaraj | B60N 2/3065 |
| 2020/0101873 | A1* | 4/2020 | Cluet | B60N 2/14 |

* cited by examiner

SEAT CUSHION TILTING APPARATUS OF FOLD-AND-DIVE SEAT

CROSS-REFERENCE TO RELATED APPLICATION

The present application claims priority to Korean Patent Application No. 10-2019-0163257 filed on Dec. 10, 2019, the entire contents of which is incorporated herein for all purposes by this reference.

BACKGROUND OF THE INVENTION

Field of the Invention

The present invention relates to a seat cushion tilting apparatus of a fold-and-dive seat. More particularly, it relates to a seat cushion tilting apparatus of a fold-and-dive seat for vehicles having folding and diving functions, which tilts a seat cushion regardless of the position of a seat back to realize a relaxation posture desired by a passenger.

Description of Related Art

A fold-and-dive seat for vehicles refers to a seat which, if a space at the rear of a seat back is loaded with long articles, etc., may perform a folding operation in which the seat back is folded towards a seat cushion because the loading space at the rear of the seat back is insufficient, and a diving operation in which the front end portion of the seat cushion is lowered to form a level rear surface of the folded seat back.

In addition to a fold-and-dive mechanism for folding the seat back, a reclining mechanism for reclining the seat back backwards to realize a fatigue-reducing posture facilitating a passenger to rest and sleep is mounted on the fold-and-dive seat.

Figure 1:
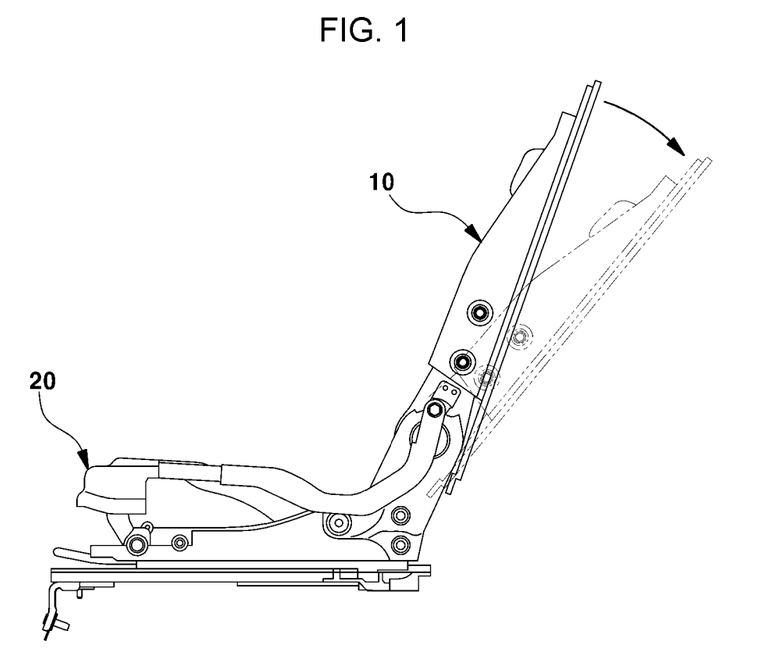
FIG. 1 and FIG. 2 are schematic views illustrating a conventional fold-and-dive seat.

In the basic posture of a general fold-and-dive seat, backward reclining of a seat back 10 may be adjusted by the reclining mechanism, and in the instant case, the basic posture of a seat cushion 20 is unchanged, as shown in FIG. 1.

Figure 2:
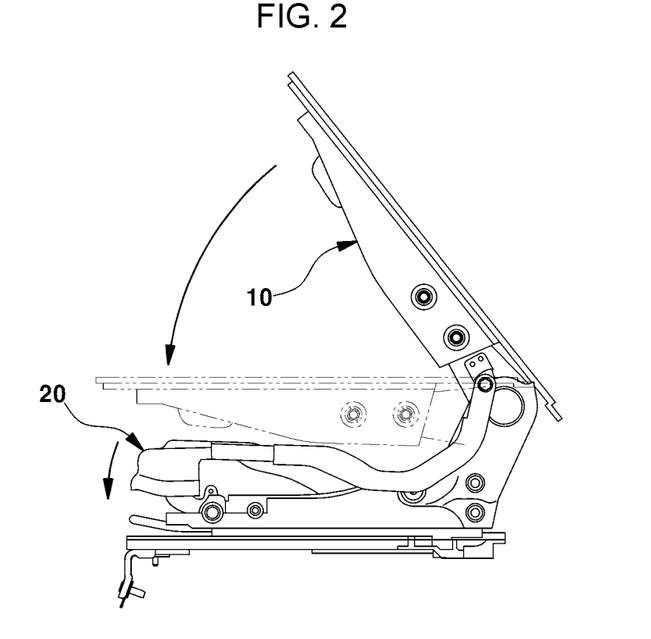

On the other hand, when the seat back 10 of the fold-and-dive seat is folded, to form a level rear surface of the seat back 10, the front end portion of the seat cushion 20 is lowered by the fold-and-dive mechanism, as shown in FIG. 2.

Accordingly, the fold-and-dive seat, in which the seat back reclining mechanism and the fold-and-dive mechanism are combined, may provide convenience to a passenger so that the passenger leans his or her upper body on the seat back 10 but maintains the fixed state of the seat cushion 20, and thus body pressure is not distributed to the passenger's hips and thighs, and accordingly, fatigue to the passenger's lower body is increased.

That is to say, in the case of the fold-and-dive seat, when the seat back 10 is folded, the front end portion of the seat cushion 20 may be lowered, but when backward reclining of the seat back 10 is adjusted, the front end portion of the seat cushion 20 may not be raised to a desired height, and thus the body pressure is not distributed to the passenger's hips and thighs, and accordingly, fatigue to the passenger's lower body is increased.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a seat cushion tilting apparatus of a fold-and-dive seat for vehicles having a fold-and-dive mechanism, which independently adjusts tilting of a seat cushion regardless of the position of a seat back to realize a relaxation posture desired by a passenger.

Various aspects of the present invention are directed to providing a seat cushion tilting apparatus of a fold-and-dive seat, the seat cushion tilting apparatus including a pair of seat cushion side frames configured to be spaced from each other in a lateral direction thereof, first and second guide brackets, each of which has an upper end portion provided with a slot formed therein and a lower end portion mounted on each of front end portions of the seat cushion side frames, first and second elevating brackets configured to be mounted on a front end portion of a seat cushion upper frame and mounted to overlap with the first and second guide brackets, a tilting guide bar passing through the first and second elevating brackets and inserted into the slots of the first and second guide brackets to be raiseable or lowerable, and an actuator including a body portion configured to be connected to the seat cushion side frames to be freely rotatable, and an output shaft extending from the body portion and connected to the tilting guide bar to be raiseable or lowerable.

In an exemplary embodiment of the present invention, rotation points at which the body portion of the actuator is connected to the seat cushion side frames to be rotatable may be located behind rotation points at which the tilting guide bar passes through the first and second elevating brackets and is inserted into the slots of the first and second guide brackets.

In another exemplary embodiment of the present invention, each of the slots of the first and second guide brackets may have a long hole shape extending in a vertical direction thereof.

In yet another exemplary embodiment of the present invention, lower end portions of the seat cushion side frames may be mounted on movable rails of seat rails.

In yet another exemplary embodiment of the present invention, a rear end portion of the seat cushion upper frame may be hinged to the seat back side frames to be rotatable.

In still yet another exemplary embodiment of the present invention, a bending portion configured to be bent forwards to facilitate easy rotation of the tilting guide bar may be formed at a middle portion of the tilting guide bar to which the output shaft of the actuator is engaged.

In a further exemplary embodiment of the present invention, the body portion of the actuator may be connected to the seat cushion side frames by hinge brackets to be freely rotatable.

In another further exemplary embodiment of the present invention, the body portion of the actuator may include an electric motor and a gear box mounted at an output shaft of the electric motor, and the output shaft of the actuator may include a lead screw configured to extend from the gear box and connected to the tilting guide bar.

In yet another further exemplary embodiment of the present invention, the electric motor may be coupled to one of the seat cushion side frames to be rotatable, and the gear box may be coupled to a remaining one of the seat cushion side frames to be rotatable.

In yet another further exemplary embodiment of the present invention, the actuator may include a gas damper unit including a rotating support bar configured to be hinged to the seat cushion side frames, a cylinder portion configured to be mounted on the rotating support bar, and a piston portion configured to extend from the cylinder portion and connected to the tilting guide bar.

Other aspects and exemplary embodiments of the present invention are discussed infra.

The above and other features of the present invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various exemplary features illustrative of the basic principles of the present invention. The specific design features of the present invention as included herein, including, for example, specific dimensions, orientations, locations, and shapes, will be determined in part by the particular intended application and use environment.

In the figures, reference numbers refer to the same or equivalent portions of the present invention throughout the several figures of the drawings.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter reference will be made in detail to various embodiments of the present invention, examples of which are illustrated in the accompanying drawings and described below. While the present invention will be described in conjunction with exemplary embodiments of the present invention, it will be understood that the present description is not intended to limit the present invention to the exemplary embodiments. On the other hand, the present invention is directed to cover not only the exemplary embodiments of the present invention, but also various alternatives, modifications, equivalents and other embodiments within the spirit and scope of the present invention as defined by the appended claims.

Figure 3:
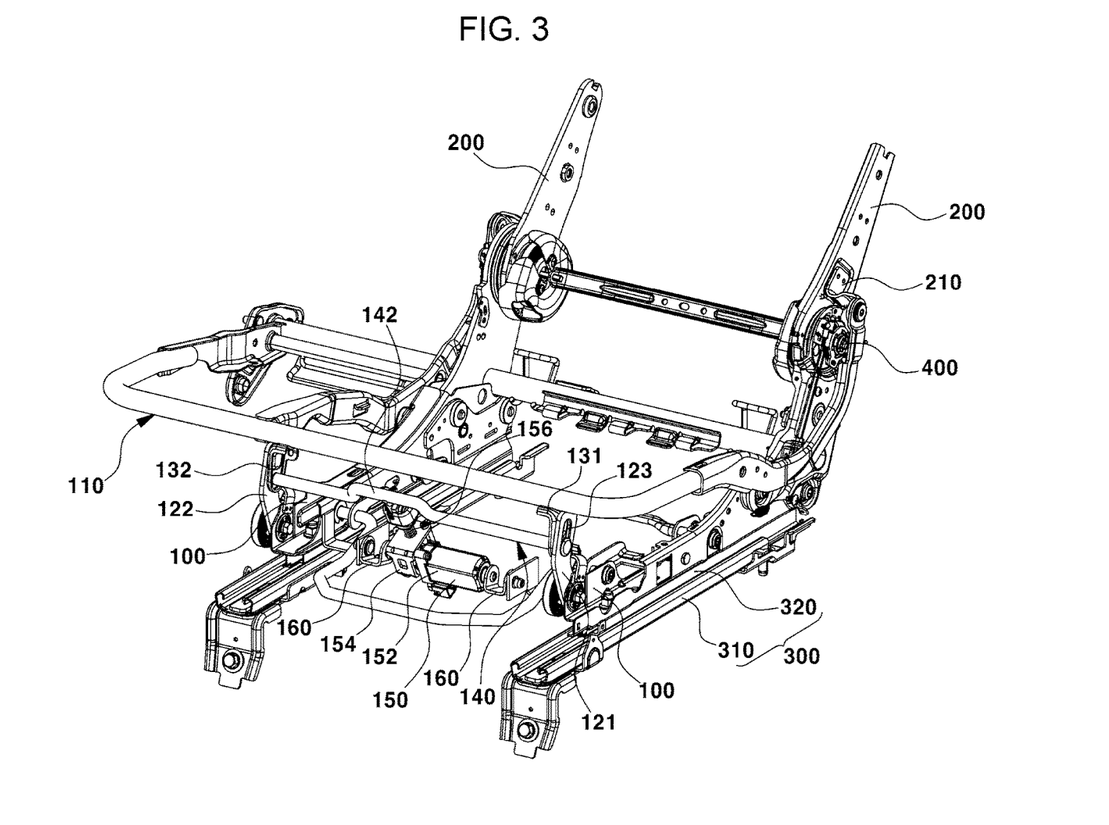
FIG. 3 is a perspective view of a seat cushion tilting apparatus of a fold-and-dive seat according to an exemplary embodiment of the present invention, in a state before tilting of a seat cushion.
Figure 4:
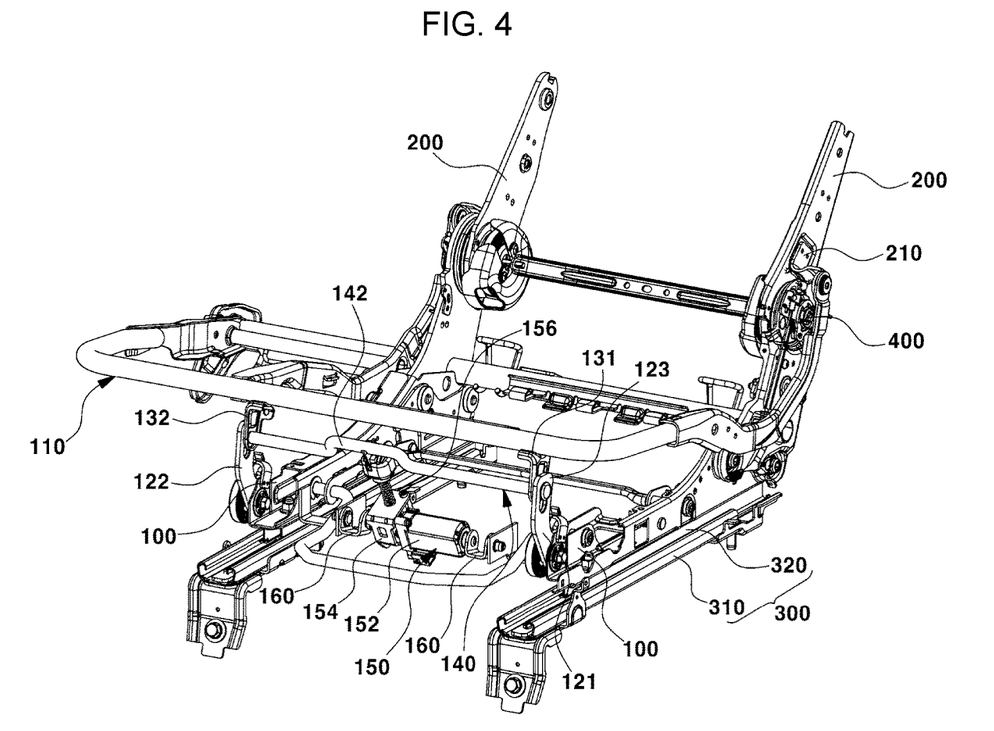
FIG. 4 is a perspective view of the seat cushion tilting apparatus according to an exemplary embodiment of the present invention, in a state after tilting of the seat cushion.
Figure 5:
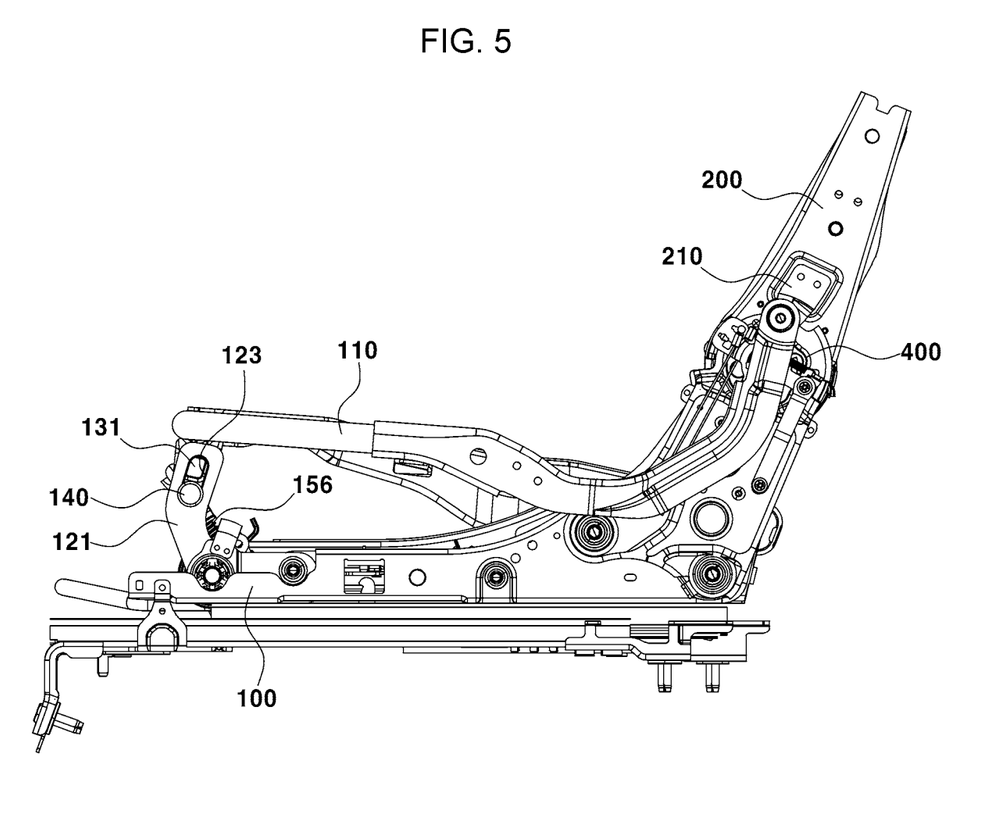
FIG. 5 is a side view of the seat cushion tilting apparatus according to an exemplary embodiment of the present invention, in the state before tilting of the seat cushion.
Figure 6:
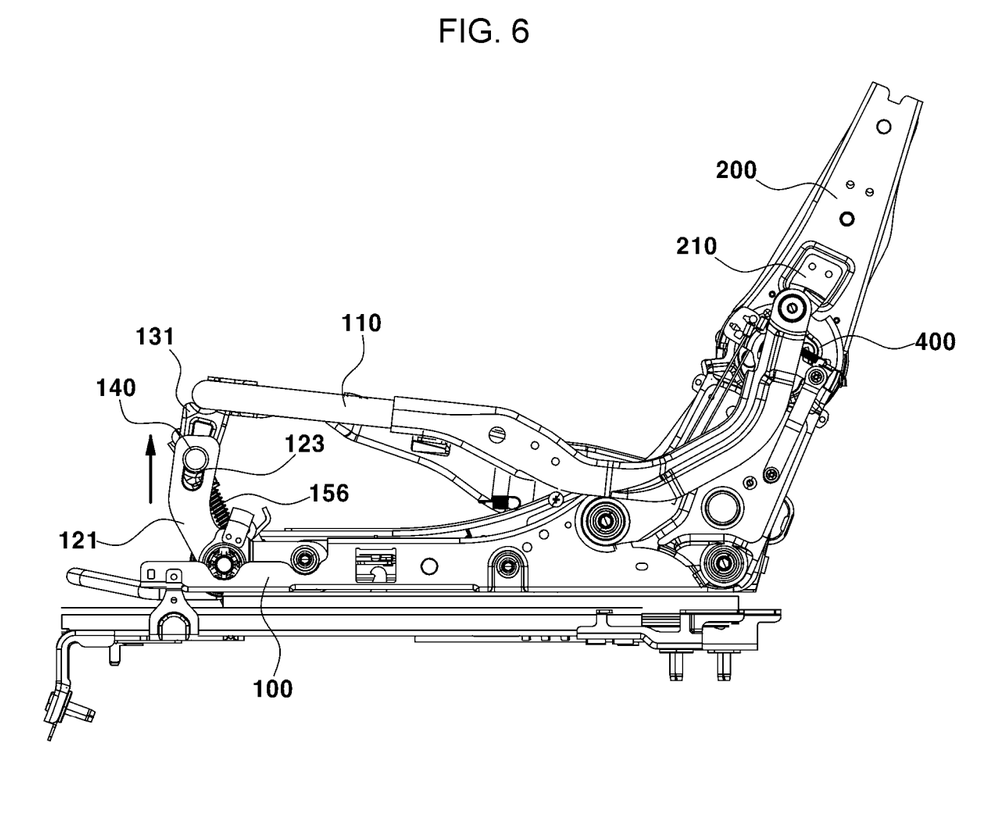
FIG. 6 is a side view of the seat cushion tilting apparatus according to an exemplary embodiment of the present invention, in the state after tilting of the seat cushion.

FIGS. 3 and 5 illustrate a seat cushion tilting apparatus of a fold-and-dive seat according to an exemplary embodiment of the present invention, in a state before tilting of a seat cushion (in a state in which the front end portion of the seat cushion is maximally lowered), and FIGS. 4 and 6 illustrate the seat cushion tilting apparatus according to an exemplary embodiment of the present invention, in a state after tilting of the seat cushion (in a state in which the front end portion of the seat cushion is maximally raised).

The fold-and-dive seat includes a pair of seat cushion side frames 100 configured to be spaced from each other in the lateral direction thereof, and a seat cushion upper frame 110 configured to be hinged to seat back side frames 200 to be rotatable.

Here, the seat back side frames 200 are coupled to the rear end portions of the seat cushion side frames 100 such that the forward and backward angle of the seat back side frames 200 is adjustable by a reclining apparatus 400.

In FIG. 3 and FIG. 4, reference numeral 300 indicates seat rails.

Each seat rail 300 include a stationary rail 310 which is fixed to a floor panel, and a movable rail 320 which is mounted on the stationary rail 310 to be slidable in the forward and backward directions.

The lower end portions of the seat cushion side frames 100 are mounted on the movable rails 320 of the seat rails 300.

Here, the rear end portion of the seat cushion upper frame 110 is coupled to the seat back side frames 200 by a hinge bracket 210 so that the seat cushion upper frame 110 substantially exhibits a tilting function.

First and second guide brackets 121 and 122 are mounted on the front end portions of the seat cushion side frames 100 to be rotatable, and the first and second guide brackets 121 and 122 have a shape in which the upper and lower end portions thereof form an obtuse angle.

The lower end portion of the first guide bracket 121 is mounted on the internal surface of the front end portion of one seat cushion side frame 100 by a hinge to be rotatable, the lower end portion of the second guide bracket 122 is mounted on the internal surface of the front end portion of the other seat cushion side frame 100 by a hinge to be rotatable, and thus, the first guide bracket 121 and the second guide bracket 122 are opposite to each other to form a symmetrical arrangement.

A slot 123 is formed through each of the upper end portions of the first and second guide brackets 121 and 122, and the slot 123 has a long hole shape which extends in the vertical direction thereof.

Furthermore, a first elevating bracket 131 and a second elevating bracket 132 are mounted at both side positions of the front end portion of the seat cushion upper frame 110.

The first elevating bracket 131 and the second elevating bracket 132 mounted on the seat cushion upper frame 110 are mounted to overlap with the first guide bracket 121 and the second guide bracket 122 mounted on the respective seat cushion side frames 100.

A tilting guide bar 140 passes through the first and second elevating brackets 131 and 132 and is inserted into the slots 123 of the first and second guide brackets 121 and 122 to be raiseable or lowerable.

That is, one end portion of the tilting guide bar 140 passes through the first elevating bracket 131 and is inserted into the slot 123 of the first guide bracket 121 to be rotatable and to be raiseable or lowerable, and the other end portion of the tilting guide bar 140 passes through the second elevating bracket 132 and is inserted into the slot 123 of the second guide bracket 122 to be rotatable and to be raiseable or lowerable.

The middle portion of the tilting guide bar 140 is connected to an output shaft (for example, a lead screw) of an actuator 150, which will be described below, and is formed as a bending portion 142 which is bent forwards so that the tilting guide bar 140 is easily rotated by driving the actuator 150.

A body portion of the actuator 150 is coupled to the seat cushion side frames 100 by hinge brackets 160 to be freely rotatable, and the output shaft extending from the body portion is connected to the bending portion 142 of the tilting guide bar 14 to be movable forwards and backwards thereof.

According to an exemplary embodiment of the present invention, the body portion of the actuator 150 includes an electric motor 152 and a gear box 154 mounted at an output shaft of the electric motor 152, and the output shaft of the actuator 150 includes a lead screw 156 extending from the gear box 154 and connected to the tilting guide bar 140.

The electric motor 152 employed as the body portion of the actuator 150 is coupled to one seat cushion side frame 100 by the hinge bracket 160 to be freely rotatable, and the gear box 154 is coupled to the other seat cushion side frame 100 by the hinge bracket 160 to be freely rotatable.

Furthermore, the lead screw 156 of the gear box 154 employed as the output shaft of the actuator 150 is mounted to be sloped upwards in the forward direction thereof, and is connected to the bending portion 142 of the tilting guide bar 14 to be movable forwards and backwards thereof.

The actuator 150 configured to raise and lower the tilting guide bar 140 and to rotate the tilting guide bar 140 may be located behind the tilting guide bar 140 so that the seat cushion upper frame 110 is tilted due to raising and lowering of the tilting guide bar and rotation of the tilting guide bar 140.

In more detail, rotation points at which the electric motor 152 and the gear box 154 employed as the actuator 150 are connected to the seat cushion side frames 100 to be rotatable are located behind rotation points at which the tilting guide bar 140 passes through the first and second elevating brackets 131 and 132 and is inserted into the slots 123 of the first and second guide brackets 121 and 122.

Accordingly, the lead screw 156 moves forwards due to driving of the electric motor 152 and the gear box 154 and may thus easily push the tilting guide bar 140 upwards, and the tilting guide bar 140 is rotated upwards and thus lifts the front end portion of the seat cushion upper frame 110, thus being configured for easily adjusting tilting of the seat cushion.

Here, operation of the seat cushion tilting apparatus having the above configuration according to an exemplary embodiment of the present invention will be referred to as follows.

Figure 7:
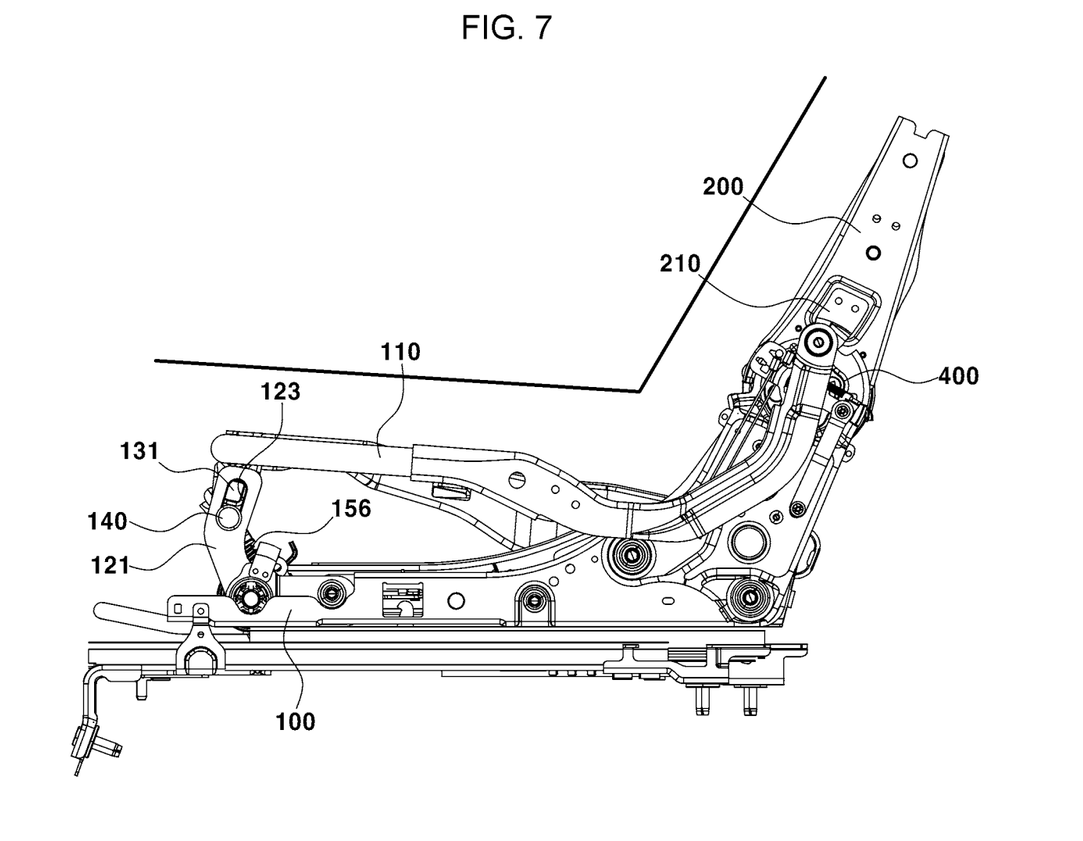
FIG. 7, FIG. 8 and FIG. 9 are side views of the seat cushion tilting apparatus according to an exemplary embodiment of the present invention, illustrating that tilting of the seat cushion is performed together with adjustment of reclining of a seat back.
Figure 8:
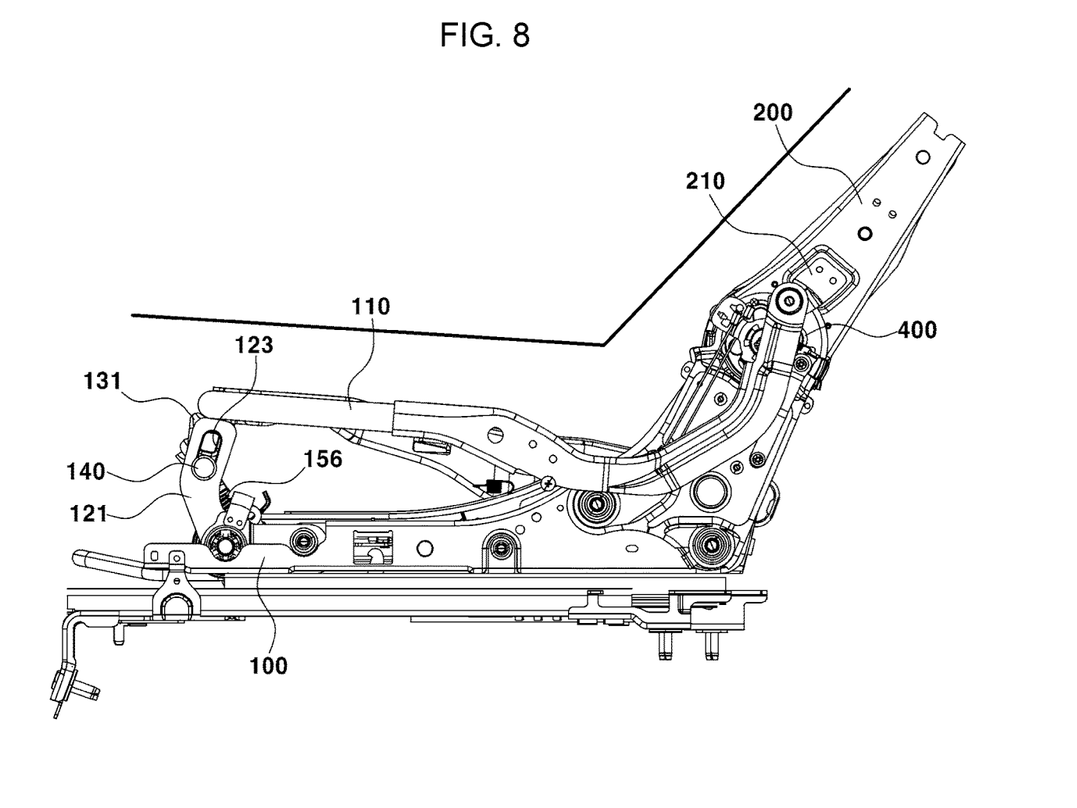
Figure 9:
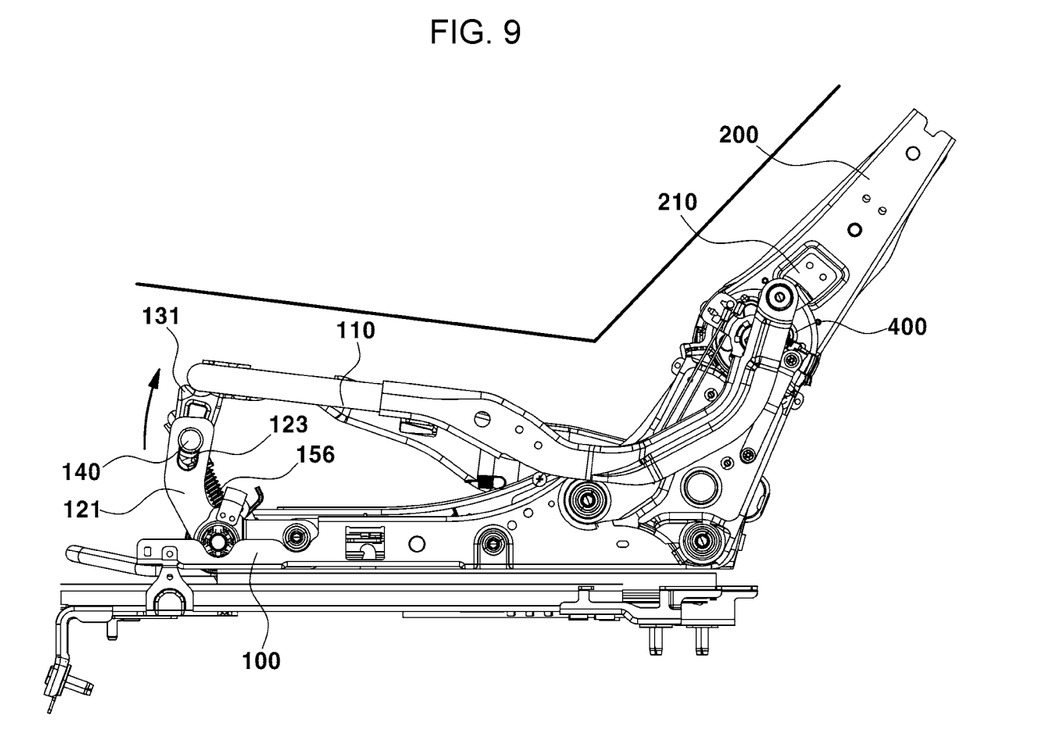

FIG. 7, FIG. 8 and FIG. 9 are side views of the seat cushion tilting apparatus according to an exemplary embodiment of the present invention, illustrating that tilting of the seat cushion is performed together with adjustment of reclining of a seat back.

As shown in FIG. 7, at standard positions of the seat cushion and the seat back, i.e., at the standard positions at which tilting of the seat cushion and reclining of the seat back are not adjusted, both end portions of the tilting guide bar 140 are located in the lowermost portions of the slots 123 of the first and second guide brackets 121 and 122.

Furthermore, the first and second elevating brackets 131 and 132, through which the tilting guide bar 140 passes, and the front end portion of the seat cushion upper frame 110, on which the first and second elevating brackets 131 and 132 are mounted, maintain standard positions thereof (i.e., are in a lowered state).

In the present standard position state, backward reclining of the seat back may be adjusted, as shown in FIG. 8.

Of course, the seat back side frames 200 are coupled to the rear end portions of the seat cushion side frames 100 such that the forward and backward angle of the seat back side frames 200 is adjustable by the reclining apparatus 400, and thus, backward reclining of the seat back may be independently adjusted regardless of adjustment of tilting of the seat cushion.

Therefore, as shown in FIG. 8, when only backward reclining of the seat back is adjusted, both end portions of the tilting guide bar 140 are located in the lowermost portions of the slots 123 of the first and second guide brackets 121 and 122, and the first and second elevating brackets 131 and 132 and the front end portion of the seat cushion upper frame 110 maintain the standard positions thereof (i.e., are in the lowered state).

In the instant case, when reclining of the seat back is adjusted, the seat cushion tilting apparatus according to an exemplary embodiment of the present invention may provide convenience to a passenger so that the passenger leans his or her upper body on the seat back but maintains the fixed state of the seat cushion, and thus body pressure is not distributed to the passenger's hips and thighs and fatigue to the passenger's lower body is increased.

To solve the present drawback, as shown in FIG. 9, when backward reclining of the seat back is adjusted, tilting of the seat cushion may be separately performed.

For the present purpose, the electric motor 152 is driven, and rotational driving force of the electric motor 152 is transmitted to the gear box 154 and is then output to the lead screw 156.

Subsequently, the lead screw 156 is moved forwards and pushes the tilting guide bar 140, and both end portions of the tilting guide bar 140 are moved toward the uppermost portions of the slots 123 of the first and second guide brackets 121 and 122.

Simultaneously, a tilting operation in which the first and second elevating brackets 131 and 132, through which the tilting guide bar 140 passes, and the front end portion of the seat cushion upper frame 110, on which the first and second elevating brackets 131 and 132 are mounted, are moved upwards from the standard positions thereof (the lowered state) is performed.

Here, since the electric motor 152 and the gear box 154 are in a freely rotatable state, the rear end portion of the seat cushion upper frame 110 is coupled to the seat back side frames 200 by the hinge bracket 210 to be freely rotatable, the front end portion of the seat cushion upper frame 110 is easily rotated upwards about the rear end portion thereof, and thus, upward tilting of the seat cushion is easily performed.

Therefore, when reclining of the seat back is adjusted, tilting of the seat cushion, i.e., raising of the front end portion of the seat cushion, may be separately performed, and thereby, body pressure may be easily distributed to the passenger's hips and thighs, increase in fatigue to the passenger's lower body may be prevented and thus the passenger may take a comfortable relaxation posture.

Figure 10:
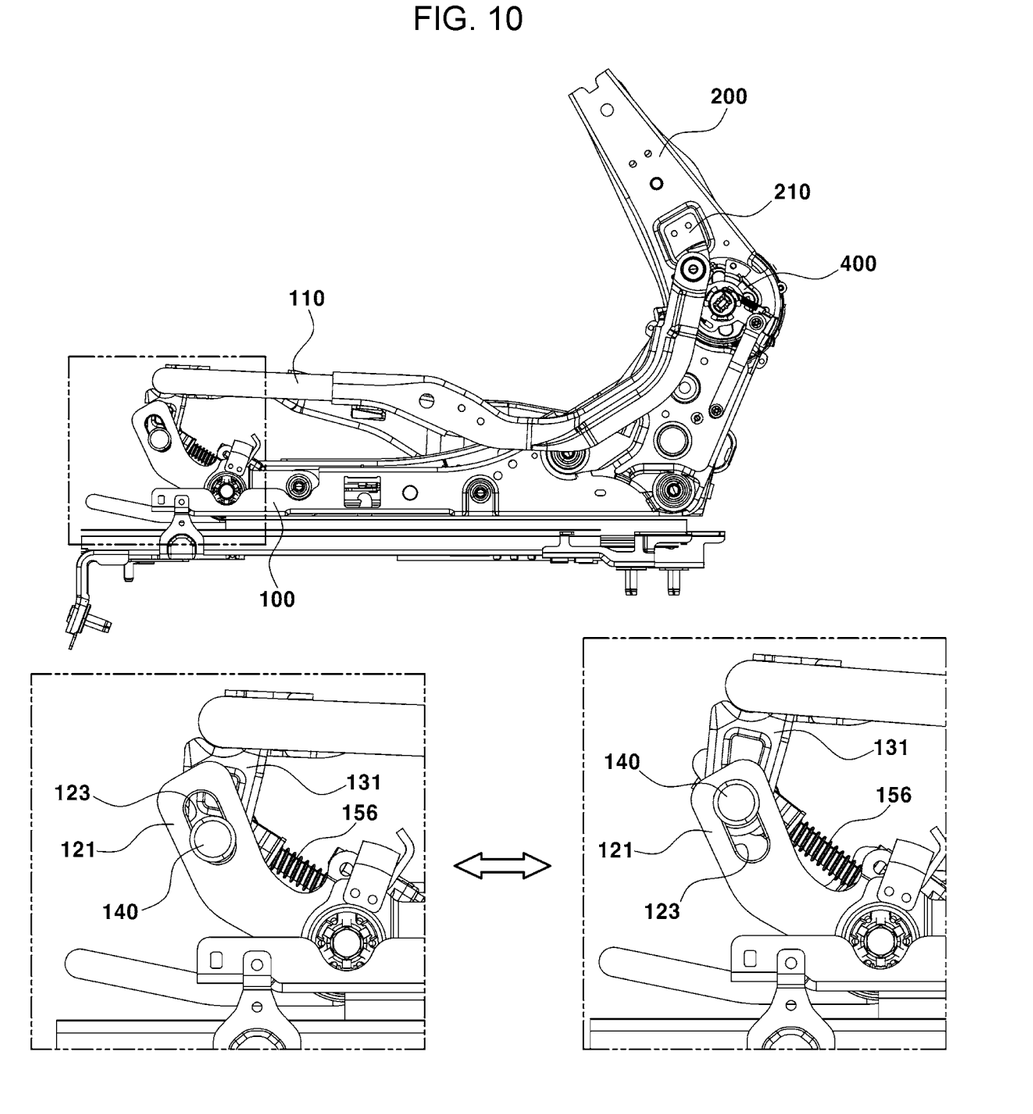
FIG. 10, and FIG. 11 are side views of the seat cushion tilting apparatus according to an exemplary embodiment of the present invention, illustrating that the seat cushion is lowered when the seat back is reclined forwards to enable a passenger to walk in or is folded.
Figure 11:
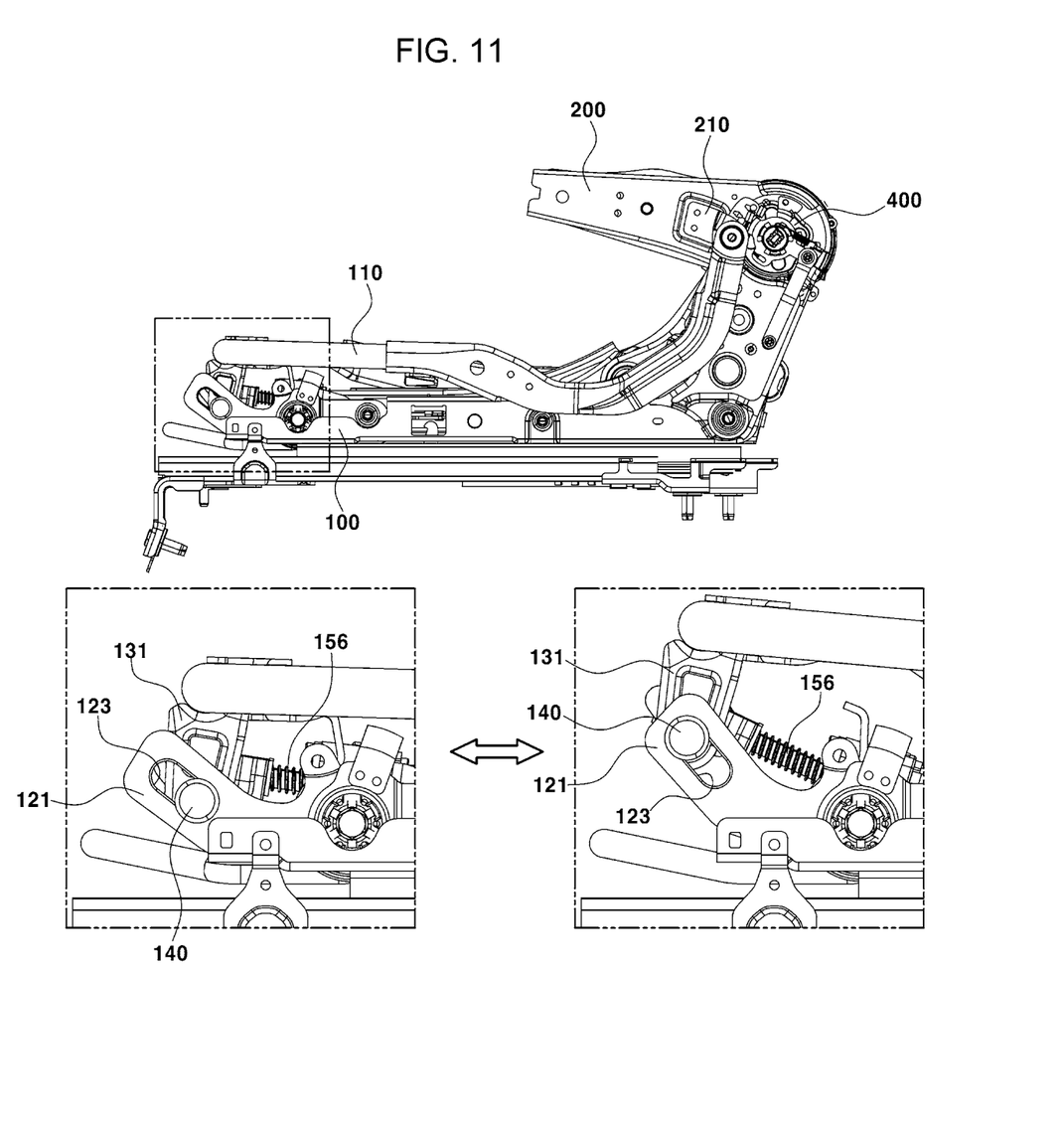

FIG. 10, and FIG. 11 are side views of the seat cushion tilting apparatus according to an exemplary embodiment of the present invention, and FIG. 10 illustrates a downward tilting operation of the seat cushion when the seat back is reclined forwards to enable a passenger to walk in, and FIG. 11 illustrates a downward tilting operation of the seat cushion when the seat back is folded.

Referring to FIG. 10, when the seat back is reclined forwards to enable a passenger to walk in, to secure a space necessary for the passenger to get into or out of a vehicle (for example, the seat back of a seat located in a second row is reclined forwards to secure a space necessary for a passenger sitting on a seat located in the second or third row to get into or out of the vehicle), the front end portion of the seat cushion may be tilted downwards.

When the seat back side frames 200 in the seat back are rotated forwards due to forward reclining of the seat back, a rotation point at which the rear end portion of the seat cushion upper frame 110 is coupled to the seat back side frames 200 by the hinge bracket 210 to be rotatable is moved forwards.

In more detail, the rotation point at which the rear end portion of the seat cushion upper frame 110 is coupled to the seat back side frames 200 by the hinge bracket 210 to be rotatable is moved forwards when the seat back is reclined forwards, as shown in FIG. 10, is in a forwardly moved state, compared to the rotation point at which the rear end portion of the seat cushion upper frame 110 is coupled to the seat back side frame 200 by the hinge bracket 210 to be rotatable is moved forwards in the standard position state shown in FIG. 7.

Therefore, the front end portion of the seat cushion upper frame 110 is pushed forwards and tilted downwards, the tilting guide bar 140 together with the seat cushion upper frame 110 is pushed forwards and thus pushes the first and second guide brackets 121 and 122, and thus, the first and second guide brackets 121 and 122 are rotated forwards about respective hinge coupled points thereof provided at the lower end portions thereof.

Here, the electric motor 152 is driven, reverse-rotational driving force of the electric motor 152 is transmitted to the gear box 154 and is then output to the lead screw 156, the lead screw 156 is moved backwards and pulls the tilting guide bar 140, and both end portions of the tilting guide bar 140 are moved toward the lowermost portions of the slots 123 of the first and second guide brackets 121 and 122.

Simultaneously, a tilting operation in which the first and second elevating brackets 131 and 132, through which the tilting guide bar 140 passes, and the front end portion of the seat cushion upper frame 110, on which the first and second elevating brackets 131 and 132 are mounted, are moved downwards is performed.

Accordingly, even when the seat back is reclined forwards to enable the passenger to walk in, the tilting operation of the seat cushion may be independently performed.

Referring to FIG. 11, even when the seat back is folded onto the seat cushion, the front end portion of the seat cushion may be tilted downwards.

When the seat back side frames 200 in the seat back are rotated forwards due to folding of the seat back, the rotation point at which the rear end portion of the seat cushion upper frame 110 is coupled to the seat back side frames 200 by the hinge bracket 210 to be rotatable is moved further forwards and is moved further downwards.

In more detail, the rotation point at which the rear end portion of the seat cushion upper frame 110 is coupled to the seat back side frame 200 by the hinge bracket 210 to be rotatable is moved forwards when the seat back is folded, as shown in FIG. 11, is in a further forwardly and downwardly moved state, compared to the rotation point at which the rear end portion of the seat cushion upper frame 110 is coupled to the seat back side frame 200 by the hinge bracket 210 to be rotatable is moved forwards in the standard position state shown in FIG. 7.

Therefore, the front end portion of the seat cushion upper frame 110 is maximally pushed forwards and tilted downwards, the tilting guide bar 140 together with the seat cushion upper frame 110 is maximally pushed forwards and thus pushes the first and second guide brackets 121 and 122, and thus, the first and second guide brackets 121 and 122 are rotated forwards at the maximum angle about the respective hinge coupled points thereof provided at the lower end portions thereof.

Here, the electric motor 152 is driven, reverse-rotational driving force of the electric motor 152 is transmitted to the gear box 154 and is then output to the lead screw 156, the lead screw 156 is moved backwards and pulls the tilting guide bar 140, and both end portions of the tilting guide bar 140 are moved toward the lowermost portions of the slots 123 of the first and second guide brackets 121 and 122.

Simultaneously, a tilting operation in which the first and second elevating brackets 131 and 132, through which the tilting guide bar 140 passes, and the front end portion of the seat cushion upper frame 110, on which the first and second elevating brackets 131 and 132 are mounted, are maximally moved downwards is performed.

Accordingly, even when the seat back is folded, the tilting operation of the seat cushion may be independently performed.

As described above, tilting of the seat cushion may be independently adjusted regardless of the position of the seat back, and thus, the passenger may adjust a desired tilting angle of the seat cushion and thereby realize a desired relaxation posture.

Figure 12:
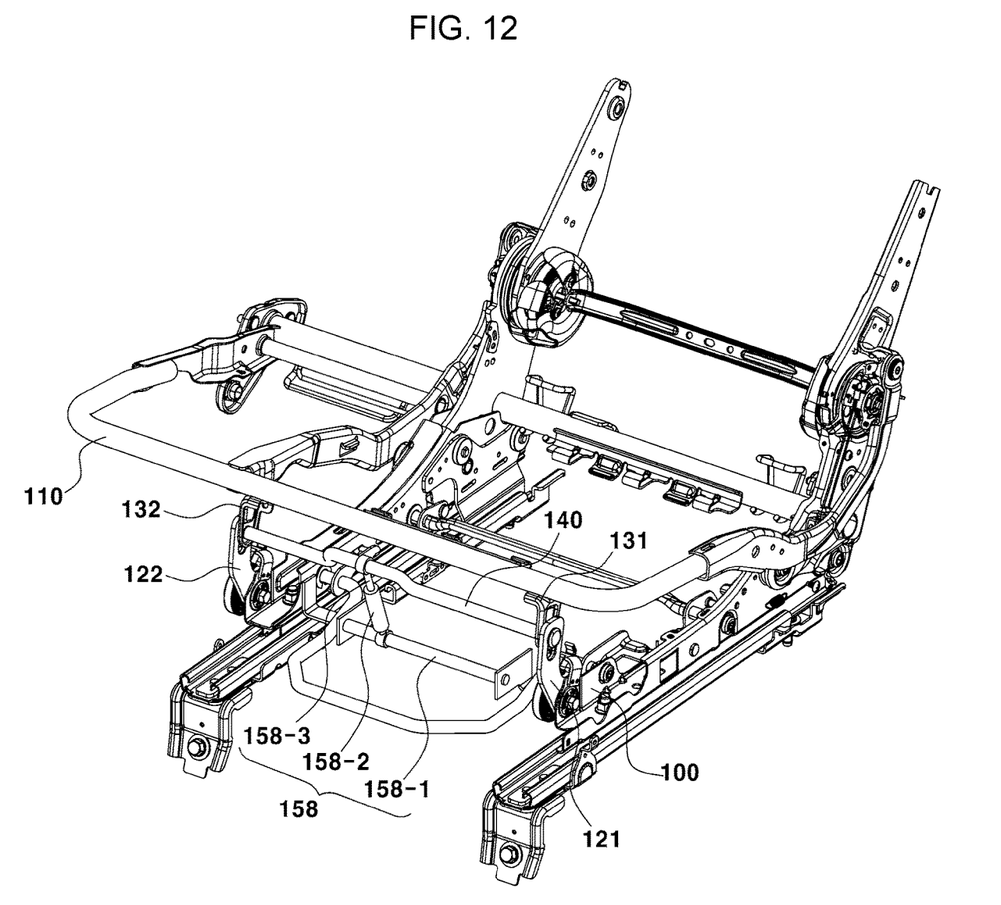
FIG. 12 is a perspective view of another exemplary embodiment of an actuator in the configuration of the seat cushion tilting apparatus according to an exemplary embodiment of the present invention.

Although an exemplary embodiment of the present invention illustrates the actuator 150 as including the electric motor 152 and the gear box 154, the actuator 150 may include a gas damper unit 158.

The gas damper unit 158 may include a rotating support bar 158-1 which is hinged to the seat cushion side frames 100, a cylinder portion 158-2 which is mounted on the rotating support bar 158-1, and a piston portion 158-3 which extends from the cylinder portion 158-2 and is connected to the tilting guide bar 140.

Accordingly, when the seat cushion is tilted, the rotating support bar 158-1 is freely rotated, the piston portion 158-3 of the cylinder portion 158-2 is moved forwards and pushes the tilting guide bar 140 upwards, or is moved backwards and pulls the tilting guide bar 140, and thereby, tilting of the seat cushion may be easily performed, as in the former embodiment.

As is apparent from the above description, a seat cushion tilting apparatus of a fold-and-dive seat for vehicles according to an exemplary embodiment of the present invention may provide the following effects.

In the fold-and-dive seat for vehicles, tilting of a seat cushion may be independently adjusted regardless of the position of a seat back, and thus, a passenger may realize a desired relaxation posture.

In more detail, both reclining of the seat back of the fold-and-dive seat and tilting of the seat cushion, in which the front end portion of the seat cushion is raised or lowered regardless of the reclining position of the seat back, are enabled, and thus body pressure may be easily distributed to the passenger's hips and thighs, and fatigue to the passenger's lower body may be reduced.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A seat cushion tilting apparatus of a fold-and-dive seat, the seat cushion tilting apparatus comprising:
    a pair of seat cushion side frames spaced from each other in a lateral direction of the fold-and-dive seat;
    first and second guide brackets, each of which includes an upper end portion provided with a slot formed therein and a lower end portion mounted on each of front end portions of the pair of seat cushion side frames;
    first and second elevating brackets mounted on a front end portion of a seat cushion upper frame and mounted to overlap with the first and second guide brackets;
    a tilting guide bar passing through bodies of the first and second elevating brackets and inserted into the slots of the first and second guide brackets to be raiseable or lowerable; and
    an actuator including a body portion connected to the pair of seat cushion side frames to be rotatable, and an output shaft extending from the body portion and connected to the tilting guide bar to be raiseable or lowerable so that tilting of a seat cushion is independently adjusted regardless of a position of a seat back,
    wherein rotation points at which the body portion of the actuator is connected to the pair of seat cushion side frames to be rotatable are located behind rotation points at which the tilting guide bar passes through the first and second elevating brackets and is inserted into the slots of the first and second guide brackets.

2. The seat cushion tilting apparatus of claim 1, wherein each of the slots of the first and second guide brackets has a first diameter and a second diameter which is longer than the first diameter.

3. The seat cushion tilting apparatus of claim 1, wherein lower end portions of the pair of seat cushion side frames are mounted on movable rails of seat rails.

4. The seat cushion tilting apparatus of claim 1, wherein a rear end portion of the seat cushion upper frame is hinged to seat back side frames to be rotatable.

5. The seat cushion tilting apparatus of claim 1, wherein a bending portion bent forwards to facilitate a rotation of the tilting guide bar is formed at a middle portion of the tilting guide bar to which the output shaft of the actuator is engaged.

6. The seat cushion tilting apparatus of claim 1, wherein the body portion of the actuator is connected to the pair of seat cushion side frames by hinge brackets to be rotatable.

7. The seat cushion tilting apparatus of claim 1,
    wherein the body portion of the actuator includes an electric motor and a gear box mounted at an output shaft of the electric motor, and
    wherein the output shaft of the actuator includes a lead screw configured to extend from the gear box and engaged to the tilting guide bar.

8. The seat cushion tilting apparatus of claim 7,
    wherein the electric motor is coupled to one of the pair of seat cushion side frames to be rotatable, and
    wherein the gear box is coupled to a remaining one of the pair of seat cushion side frames to be rotatable.

9. The seat cushion tilting apparatus of claim 7, wherein a bending portion bent forwards to facilitate a rotation of the tilting guide bar is formed at a middle portion of the tilting guide bar to which the output shaft of the electric motor is engaged.

10. The seat cushion tilting apparatus of claim 1, wherein the actuator includes:
    a gas damper unit including a rotating support bar hinged to the pair of seat cushion side frames;
    a cylinder portion mounted on the rotating support bar; and
    a piston portion extending from the cylinder portion and connected to the tilting guide bar.

* * * * *